Nov. 30, 1954  C. F. KAYAN  2,695,750
METHOD AND APPARATUS FOR ANALYZING FLOW NETWORKS
Filed Dec. 7, 1945  3 Sheets-Sheet 1

*INVENTOR.*
CARL F. KAYAN
BY
Pennie, Edmonds, Morton Barrows & Taylor
ATTORNEYS

*INVENTOR.*
CARL F. KAYAN

ATTORNEYS

Nov. 30, 1954   C. F. KAYAN   2,695,750
METHOD AND APPARATUS FOR ANALYZING FLOW NETWORKS
Filed Dec. 7, 1945   3 Sheets-Sheet 3

INVENTOR.
CARL F. KAYAN
BY
ATTORNEYS

United States Patent Office

2,695,750
Patented Nov. 30, 1954

2,695,750

METHOD AND APPARATUS FOR ANALYZING FLOW NETWORKS

Carl F. Kayan, New York, N. Y.

Application December 7, 1945, Serial No. 633,476

11 Claims. (Cl. 235—61)

This invention relates to methods and apparatus for determining the rate of flow and the attendant pressures in the various branches of a flow path such as a complex distribution network of pipe lines through the method of simulating actual flows in the network by means of an equivalent electrical circuit network. Herein the actual flow in each branch will then be indicated by the electrical flow, i. e., current in the electrical circuit, and the actual pressure at any point will be indicated by the electrical potential voltage at the equivalent point in the electrical network.

In the design of systems of flow distribution, such as for water supply, through a network of numerous interconnected pipe-line branches, it is necessary to choose pipe sizes for each of the different branch lengths such that the flow quantities will be correct for the pressure differences involved. Any finished design is ultimately to be checked by estimating the resultant pressure drop for the different individual branches and their respective flows, and then comparing the total overall pressure drop with that actually available. This process of estimating is extremely difficult, particularly when many branches are involved, since the relationship between flow and pressure drop in a pipe line is not a simple one of direct proportionality.

Numerous mathematical expressions for pipe-line flow are in practical use. One of them, widely employed, is: $h = cfQ^2$. Herein $h$ = pressure head between the two ends of the given pipe, in units such as feet of fluid, or in units such as pounds per square inch pressure drop between the ends of the pipe;

$c$ = a constant, embodying the physical characteristics of the pipe and of the transported fluid, such as the length and diameter, density and viscosity of the fluid.

$f$ = friction factor, which itself may vary with the flow rate;

$Q$ = flow rate, quantity per unit of time, as for example, gallons per minute.

If the friction factor $f$ were constant over the range of $Q$, the relationship would be one of $h$ proportional to the square of the flow quantity $Q$. However, if the friction friction factor $f$ varies with the flow rate $Q$ the equation holds good for only one predetermined pressure. Hence changes in pressure will alter the flow rate in a manner which cannot be determined by an elecrical network analyzer wherein the friction factor is represented by a constant.

This invention relates to an improvement in electrical network analyzers for simulating the values of actual flow and pressure drop in a complex network wherein the variation in the friction factor $f$ because of variations in flow is automatically provided for.

Actual flow $h = cfQ^2$ conditions may be simulated electrically by employing Ohm's law for electrical circuits. Here, $E = RI$, where E is the electrical potential difference in volts, R is the electrical resistance in ohms, and I is the electrical current in amperes. The equation for actual flow can be rearranged to read $h = (cfQ)Q$. Thus the forms of the two equations become similar, the latter equation compared with that of Ohm's law. This is particularly evident when $(cfO)$ is regarded as the pipe-line resistance to flow (represented electrically by the electrical resistance R), Q taken for the flow quantity (represented by the electrical current I), and $h$, the pressure difference (represented by E, the voltage difference). Thus, by establishing proper scale relationships between the actual physical quantities and the corresponding electrical values, the analogy between fluid flow and electrical flow may be recognized.

It is, however, obvious that adjustment of electrical resistance must be appropriately made for the different flow rates, in order to account for the shifting values of equivalent pipe-line resistance. Herein lies the improvement in the present invention over past techniques, techniques in which the pipe-line network has been simulated by an electrical resistance network employing a constant pipe line resistance factor $f$. On such previous network "analyzers" it has been necessary to adjust the resistance values in each branch circuit manually in accordance with the indicated flow, by successive trial and error methods. This has been a laborious operation, particularly so in multi-branched networks. By means of the present invention, this adjustment of resistance values is accomplished automatically and continuously on each branch circuit, and in accordance with the desired scheme of variation.

Specifically, therefore, this invention relates to devices for automatically setting-up the relationship between the electrical potential difference, the electrical current, and the electrical resistance, which latter resistance value itself must shift in magnitude and in a prescribed manner commensurate with the current. Thus, for example in applying the present invention to the analysis of a given pipe-line network, each individual branch is represented in the equivalent electrical network by its corresponding automatic device. An electrical potential difference is then established over the whole of the electrical network. Each automatic device, according to its prearranged and pre-set characteristic, will then automatically adjust its circuit resistance commensurate with the electrical current flowing due to the built-up potential differences within the network. When all of the devices reached their ultimate balance conditions, the current in each branch can then be determined by means of an included current-measuring device, and the voltage at each end of the branch circuit also measured.

In the accompanying drawings I have illustrated several forms of apparatus embodying my invention and also my improved method of using such apparatus in determining the rates of flow of fluid in a pipe network.

In the said drawings.

Figure 1:
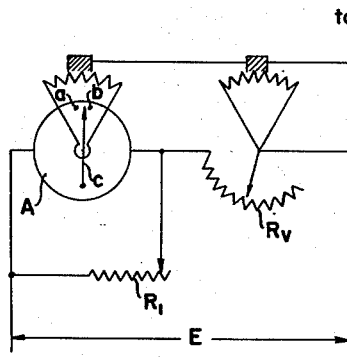
Fig. 1 represents diagrammatically a simple form of apparatus embodying my invention.

Figs. 7, 9a, 10a and 11 to 17 inclusive are views similar to Fig. 1 showing different modifications of the apparatus.

Figure 7:
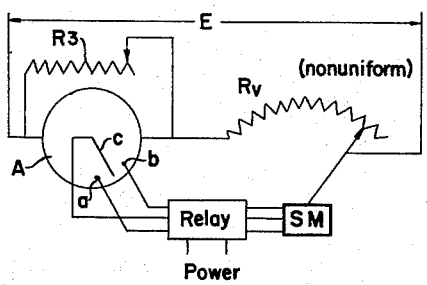
Figure 8:
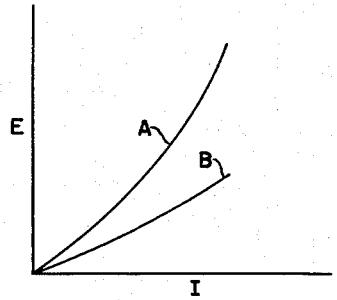
Figure 9A:
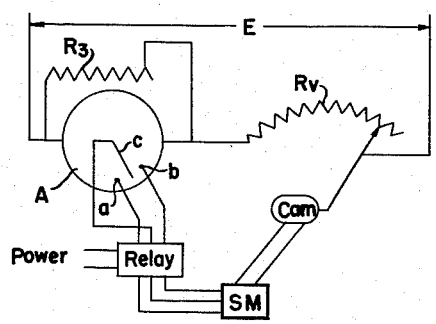
Figure 9B:
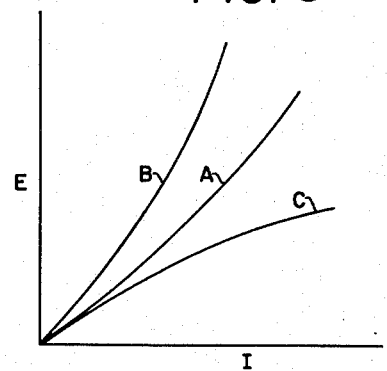
Figure 9C:
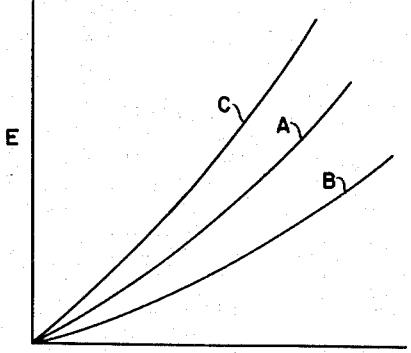
Figure 10B:
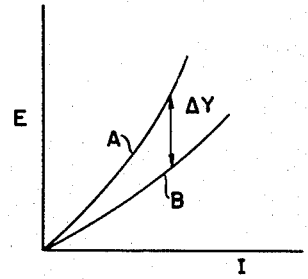
Figure 10A:
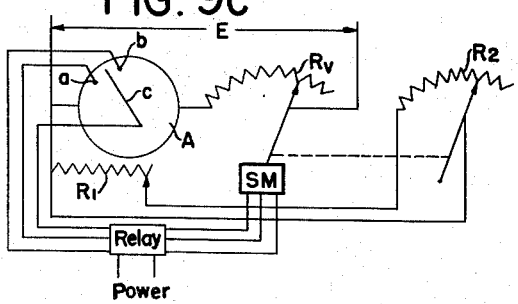

Figs. 8, 9b, 9c and 10b are graphs referred to in connection with Figs. 7, 9a and 10a respectively.

In the various devices for automatically regulating the resistance of the circuit to obain the desired characteristic of potential difference across the circuit commensurate with the current flowing, an electrical servomotor commanded by forward and reversing contacts on the unbalance-detecting equipment adjusts the circuit resistance until balance or equilibrium conditions result. At this time, the potential difference and the circuit current for the particular branch may be separately determined.

Figure 2:
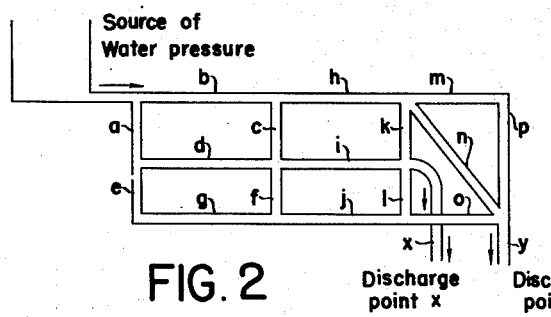
Fig. 2 shows a pipe network in the several branches of which the rates of flow are to be determined.
Figure 3:
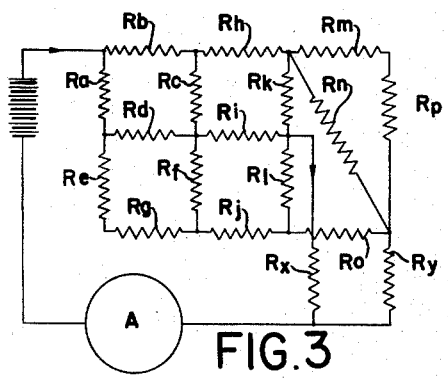
Fig. 3 shows an electrical set-up simulating the pipe network shown in Fig. 2.

It is obvious that whereas only a few branches or a network have been shown in the pipe-line network of Figure 2 and the corresponding electrical network of Figure 3, many more branches may constitute a network, and may be handled merely by representing each one by its own controlling device. Furthermore, additional sources of pressure or potential may be introduced at different points throughout the network, as well as additional discharge or outlet points, to whatever number required by the conditions.

The individual automatically controlled circuit units, with their individually pre-arranged and pre-set characteristics, may of course be utilized in analyzing distribution with various types of flow, including that of water, gas, oil, heat transfer, etc., and in general for any phenomena subject to treatment by the flow concept. The units may furthermore be used separately where the variable characteristic of electrical potential difference commensurate with the current flowing may be employed to determine corresponding values of the one versus the other, and where the relationship is not one of direct proportionality, but which may be described by mathematical formula or through the graphical relationship of one value plotted against the other.

Figure 5:
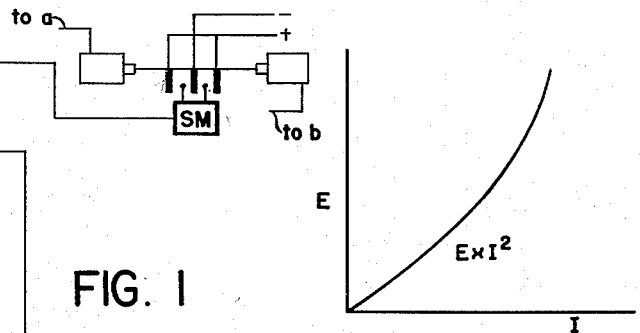
Fig. 5 is a graph referred to in connection with Fig. 1.

One form of the automatically controlled circuit for a single branch is shown in Figure 1. Servo-motor SM, operating off deflecting ammeter A carrying needle contact $c$ working in cooperation with movable contacts $a$ and $b$, directly adjusts resistance $R_v$ such that it varies directly with the circuit current I. The servo-motor SM adjusts the position of the movable contacts $a$ and $b$ commensurate with the adjustment on resistance $R_v$. Thus at balance the contacts $a$ and $b$ will have been positioned through the operation of the servo-motor to a point commensurate with the current I, such that the voltage E will be proportional to the square of circuit current I. Such a relationship is shown in Figure 5. As is customary in circuits of this general type, the resistance of the ammeter A may be neglected.

Shunt resistance $R_1$ is introduced parallel to the ammeter A, and may be adjusted in value to vary the range of control device through diversion of part of the circuit current from the ammeter A in any desired ratio, the full circuit current, however, going through the adjustable resistance $R_v$ and accounting for a corresponding voltage drop.

The adjustable resistance $R_v$ may be installed in multiple sets such that these servo-adjusted resistance units of different individual resistance range may be connected together either in series or in parallel to give a wide range of resistance change between zero and maximum value, corresponding to meter deflection from zero to maximum.

Figure 4:
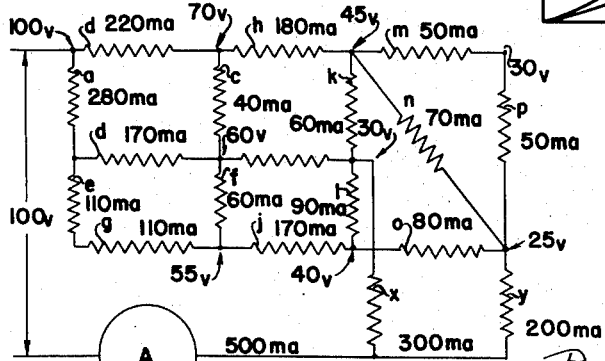
Fig. 4 is a similar view showing the flow values as determined in accordance with the example described.

Figure 2 represents a typical pipe-line network, and Figure 3 its electrical network counterpart. On the basis of the pressure drop for each branch varying as the square of the flow rate and the electrical equivalent shown as Figure 4, each branch of the network may be represented by an automatic device such as just described and represented by Figure 1. For each branch the characteristic of pressure drop vs. flow rate is assumed to vary as the square of the flow rate. This may be represented in the equivalent electrical form as $E = CI^2 = (CI)I$, where CI is representative of the equivalent flow resistance. Depending on the length and diameter of each branch line, the factor C will be indicative of the magnitude of the line resistance factor. The relative magnitudes of the line resistance factors embracing length and diameter will thus be shown by the relative values of C for the different branches of a network.

Figure 6:
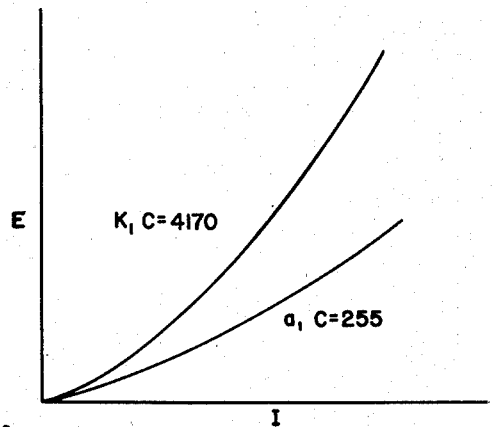
Fig. 6 is a similar graph showing typical values of voltage and current in two of the branches of Fig. 4.

Suppose, therefore, that corresponding to each flow branch condition, the factor C is as given in Table 1. A curve showing the equivalent E vs I is shown typically for branch $a$, with $C=255$, and for branch $k$ for $C=4170$, in Figure 6. Thus, for the same flow rate, the relative values of the pressure drops would likewise stand in the same ratio as the factors C. Each automatic unit will reproduce its equivalent curve based on its own C, thus with the corresponding E and I commensurate with the physical values of the pressure drop and the fluid flow quantity. An overall pressure difference for the entire network of 100 units is assumed to be acting; the equivalent value in the electrical circuit will be assumed to be 100 volts. Ultimate discharge quantities of 30 and 20 gallons per minute are assumed for the discharge branches $x$ and $y$ respectively, equivalent electrically to 300 and 200 milliamperes on the basis of 10 milliamperes equivalent to 1 G. P. M.

For branches $x$ and $y$, the automatic regulators for the discharge flow must adjust for a constant value of 300 and 200 milliamperes respectively, throughout the course of their operation. Accordingly, they are arranged with the movable contact element manually set at 300 and 200 respectively, this contact element with contacts $a$ and $b$ not mechanically coupled to the servo-motor as for the regular control devices corresponding to Figure 1. The servo-motor, under command of the contacts $a$ and $b$ in conjunction with contact $c$ on the deflecting needle of the meter, adjusts the circuit resistance $R_v$ continually to maintain the required discharge branch current.

Thus, when voltage is put across the overall network, each unit of the system will position automatically, such that when 100 volts are used, and $x$ and $y$ operate to permit the fixed currents to pass, each branch unit will adjust its resistance such as to give the following results for the final equilibrium (Table 1). These final results are shown directly in Figure 4. Table 1 shows the branch electrical currents and the voltage drops. These final results depict electrical balance conditions commensurate with the actual flow conditions, with relative pressures and flow quantities to be deduced from the electrical values. Thus, for an overall pressure difference of 100 pounds per square inch, and discharge quantities at $x$ and $y$ of 30 and 20 G. P. M. respectively, the final results for each branch, based on its characteristic factor C, are shown likewise in Table 1.

*Table 1*

| Branch | C | I (milliamps.) | E (voltage drop) | G. P. M. | Pressure Difference, lbs. |
|---|---|---|---|---|---|
| a | 255 | 280 | 20 | 28 | 20 |
| b | 620 | 220 | 30 | 22 | 30 |
| c | 625 | 40 | 10 | 4 | 10 |
| d | 693 | 170 | 20 | 17 | 20 |
| e | 828 | 110 | 10 | 11 | 10 |
| f | 1,390 | 60 | 5 | 6 | 5 |
| g | 1,240 | 110 | 15 | 11 | 15 |
| h | 772 | 180 | 25 | 18 | 25 |
| i | 1,331 | 150 | 30 | 15 | 30 |
| j | 519 | 170 | 15 | 17 | 15 |
| k | 4,170 | 60 | 15 | 6 | 15 |
| l | 1,234 | 90 | 10 | 9 | 10 |
| m | 3,600 | 50 | 9 | 5 | 9 |
| n | 4,080 | 70 | 20 | 7 | 20 |
| o | 2,340 | 80 | 15 | 8 | 15 |
| p | 4,400 | 50 | 11 | 5 | 11 |
| x | (333) | 300 | 30 | 30 | 30 |
| y | (625) | 200 | 25 | 20 | 25 |

As will be noted, a total flow of 50 G. P. M. is indicated for the entire network, under a network pressure difference of 100. Branch distributions and their respective pressure drops are shown, to correspond to the line factor C. Thus, for example, branch $k$ was represented by a factor C of 4170. The controlling device representing this branch, functioning to give E proportional to the square of the current I, automatically controlled its circuit resistance such to give an E vs. I relationship as given in Figure 6. Typically for a current of 10 ma., it would show a value of E of 0.417, and for a current of 60 ma., it actually showed 15 volts. Similarly for branch $a$ with a factor C of 255. For a current of 100 ma., it would show a value of E of 2.55 volts; however, with 280 ma., it actually showed 20 volts.

Each of the different branch devices automatically adjusted itself for the composite balance conditions of the interrelated network, thus involving automatic adjustment of the branch circuit resistance whereas without automatic control a network analyzer would require tedious manual control for each individual branch by the trial and error method.

Whereas the device of Figure 1, and the preceding example are based on the simple characteristic of E varying with the square of the current I, still as indicated earlier, any other relationship of E vs. I may be handled. Automatic control may be achieved by various means. For example, as shown in Fig. 7, the variable resistance $R_v$, instead of varying uniformly over its range to give a resistance proportional to its adjusted position, may be specially wound or constructed so as to give any desired resistance variation over its range of adjustment, thus giving an E vs. I circuit characteristic different from E proportional to current I squared, as shown typically in Figure 8. For this control arrangement curve A shows the case of uniform variation and curve B a non-uniform variation according to any desired scheme.

It will be understood that in the arrangement shown diagrammatically in Figs. 7, 9a, 10a, and 11 to 17, inclusive, the contacts $a$ and $b$ are adjusted by the servo-motor in the same manner as in Fig. 1.

Another method of achieving the desired result is through the use of a cam. Figure 9a shows the circuit diagram, Figure 9b typical resistance characteristic, and Figure 9c the overall circuit performance characteristic E vs. I for resistance characteristics shown in Fig. 9b. For Figure 9a, servo SM operating off deflecting ammeter A carrying servo operating contact c working in cooperation with servo-positioned contacts a and b, controls adjustable resistance $R_V$, such to vary resistance value with current I. This adjustment is carried out through use of a servo-operated cam, resistance $R_V$ varying with current I, but not uniformly.

If $R_V$ varied directly with the current I, curve A of Figure 9b would apply. Actually, either a falling or a rising resistance characteristic may be introduced, as desired, by proper cam shape, with curves such as B and C, either mathematically regular or irregular. The equivalent E vs. I curves appear in Figure 9c to correspond to the resistance curves of Figure 9b.

As in the automatic device of Figure 1, shunt resistance $R_3$ is employed for changing the particular range of the equipment.

Still another method is illustrated in Figure 10a. Servo SM operating off deflecting ammeter A with positioning contacts adjusts $R_V$ to vary it directly proportional to the ammeter current. Range of values handled can be controlled through setting of adjustable shunt resistance $R_1$. To modify resultant value of E so as to deviate from values proportional to the current squared (Figure 10b, curve A), shunt resistance $R_2$ is progressively varied throughout variation of $R_V$ by means of a cam mechanism (not shown) the shape of the cam being such to produce the desired correction effect $\Delta Y$ on curve B by introducing appropriate values of $R_2$.

Figure 11:
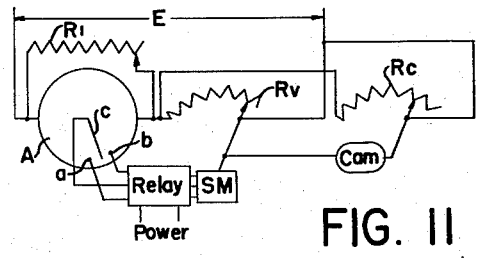

Another method is illustrated in Figure 11. Servomotor SM operating off contacts of ammeter A drives resistance $R_V$ such that $R_V$ varies with value of ammeter current. In order to change the overall range of the device, shunt resistance $R_1$ may be appropriately varied. To modify the resultant quadratic relationship between voltage and current, variable resistance $R_c$ in parallel with $R_V$ is varied through the medium of a cam driven by the servomotor, the cam appropriately constructed such that the variation of $R_c$ will produce the required overall relationship of voltage vs. current. For some cases, $R_c$ may itself be kept as a fixed resistance throughout the variation of $R_V$ by the servomotor, and may be installed alternately in series with $R_V$ rather than in parallel.

Figure 12:
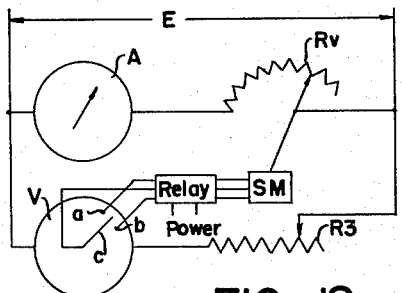

Figure 12 shows another method, involving a voltmeter as controlling element. Servomotor SM, operating through deflecting voltmeter V with needle contact c working in cooperation with moveable contacts b and a, positions variable resistance $R_V$ such that its value is dependent on the voltage indication of meter V. Adjustable resistance $R_3$ serves to shift the range of the equipment to handle different values.

Figure 13:
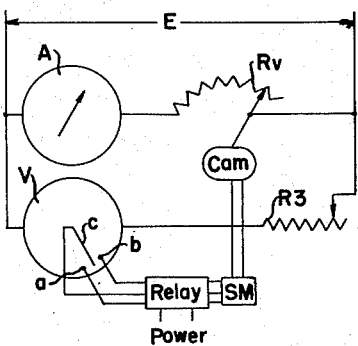

Figure 13 shows still another method involving a voltmeter as controlling element. Deflecting voltmeter V with needle contact c and moving contacts a and b commands servomotor SM. SM positions contacts a and b, and varies the value of resistance $R_V$ through an appropriately designed cam, thus to bring about the desired overall relationship of circuit voltage with respect to circuit current. $R_3$, an adjustable resistance, serves for the purpose of varying the range of the device.

Figure 14:
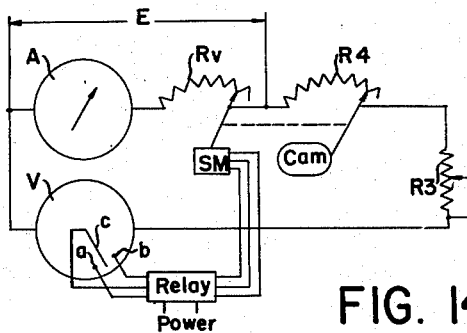

Figure 14 illustrates another form. Here resistance $R_V$ is varied in accordance with the voltage indicated on deflecting voltmeter V. $R_V$ being controlled through the servomotor SM commanded by contact c working in cooperation with contacts a or b. Resistance $R_3$ is an adjustable resistance for overall range control for the unit. Resistance $R_4$, installed either in parallel with $R_3$, or in series with it, is progressively varied in value by means of a properly designed cam working in cooperation with the servomotor SM.

Figure 15:
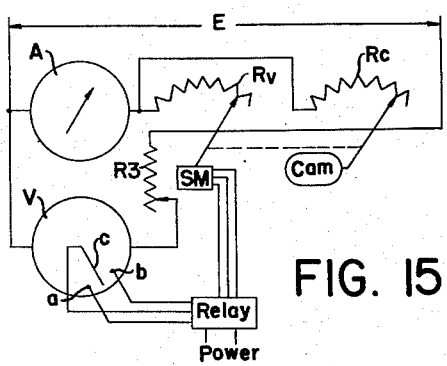
Figure 16:
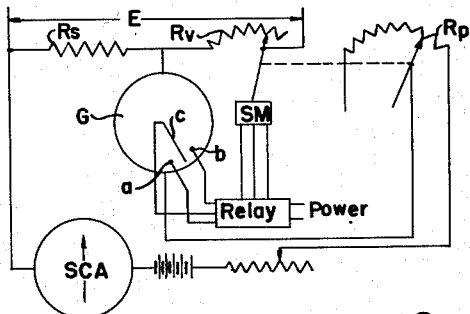
Figure 17:
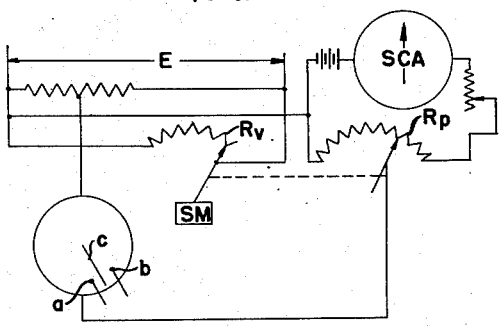

Still another form using a voltmeter element is shown in Figure 15. Deflecting voltmeter V, with moving servomotor driven contacts a and b working in cooperation with needle contact c, commands servomotor SM which in turn varies the value of resistance $R_V$, and also which varies the value of $R_c$ which is installed in parallel with $R_V$. The value of resistance $R_c$ is adjusted through the action of the servomotor in cooperation with a properly shaped cam to give the desired overall voltage characteristic with respect to the circuit current. For some cases $R_c$ may itself be kept as a fixed invariable resistance throughout the variation of $R_V$ by the servomotor, and may alternately be installed in series with $R_V$ rather than in parallel. Adjustable resistance $R_3$ serves for the adjustment of the range for the overall equipment.

In place of the deflecting ammeter element A which serves to measure meter current and to control the servomotor through the cooperatively acting contacts a, b, and c, a fixed resistance may be susbtituted for current measurement, using a potentiometer method for evaluation in conjunction with a null type contacting galvanometer to command the servomotor. The servomotor SM positions both the potentiometer measuring resistance and the controlled adjustable resistance $R_V$. This method is shown typically in Figure 16.

Similarly, in place of the deflecting voltmeter element V which serves to measure meter voltage and to control the servo-motor through the cooperatively acting contacts a, b, and c, a fixed resistance may be substituted for voltage measurement, using a potentiometer method for evaluation in conjunction with a null type contacting galvanometer to command the servo-motor. The servomotor SM positions both the potentiometer measuring resistance $R_p$ and the controlled adjustable resistance $R_V$. This method is shown typically in Figure 17.

My improved method and apparatus may be employed for determining rates of flow other than that of a fluid in a pipe network. The transmission of heat through a conductor follows similar laws as the flow of fluid and may be analyzed by my improved method and apparatus.

By way of example in the realm of heat transfer, the flow of heat through a thick wall from a hot fluid on one side, such as hot gas in natural convection, to a cold fluid on the other side, such as air in natural convection, offers a typical case. Heat flow may be considered to take place with the difference between the two temperature levels constituting the motivating force, and acting across the interposed different media as resistances. This would be the case for a thick furnace wall separating hot furnace gases from the surrounding cold atmosphere. This process may similarly be represented by electrical simulation as in the case of fluid flow.

The opposition to heat flow between the source fluid and the wall may be regarded as one resistance; the wall itself, simple or composite, may be regarded as additional resistance; and finally the opposition to heat flow between the wall and the lower temperature fluid, as still another resistance. Herein these resistances act in series. It is to be noted that they are not constant, but rather variable, during operation. The fluid boundary resistances vary with the actual temperature differences which prevail between the wall surfaces and the fluids. If the total wall is divided up into equal thickness increments, each represented by its own resistance, then as the temperature throughout the wall changes, so will the resistance of the wall sections change due to change in conductivity.

Thus, in electrical simulation of heat flow in this case, the different elements of the heat flow path may be represented by series-connected automatic devices controlling their resistance according to a pre-set and pre-arranged program; for the fluid resistance, such that its value will be commensurate with the voltage drop across it, and for the individual units constituting sections of the wall, such that the resistance be modified according to the pre-arranged and pre-set program dependent on the voltage at which it operates, thus simulating the effect of thermal resistance dependency on operating temperature.

It will be understood that other "flows" may be similarly analyzed and that modifications of the apparatus other than those illustrated may be made within the scope of my invention as defined in the appended claims.

I claim:

1. The method of determining the flow in a flow path which consists in setting up an electric circuit simulating the path through which the flow is to be determined, passing electric current through said circuit, adjusting the voltage of said applied current with relation to the motivating intensity of the force producing the flow, placing a resistance in said circuit and continuously maintaining a fixed relation between the value of said resistance and the value of the current flowing in said circuit regardless of variations in the motivating intensity of the force producing the flow.

2. The method of determining the flow in a network having a plurality of separate paths which consists in setting up an electric circuit having branches corresponding with said separate paths, passing electric currents through said circuits, adjusting the voltage of said applied current in relation to the motivating intensity of the force producing the flow, placing in each branch of said circuit a resistance corresponding to resistance to flow of the corresponding path and continuously maintaining a fixed relation between the value of said resistance and the value of the current flowing in the branch containing said resistance regardless of variations in the motivating intensity of the force producing the flow.

3. The method of determining the flow of fluid in a pipe which consists in setting up an electric circuit simulating the pipe line through which the flow is to be determined, passing electric current through said circuit, adjusting the voltage of said applied current with relation to the pressure at the intake end of said pipe line, placing a resistance in said circuit and continuously maintaining a fixed relation between the value of said resistance and the value of the current flowing in said circuit regardless of variations in the motivating intensity of the force producing the flow.

4. The method of determining the flow in a branch of a pipe network having a plurality of branches supplied from a common source which consists in setting up an electric circuit having branches corresponding with the branches of the said network, passing electric currents through said circuit, adjusting the voltage of said applied current in relation to pressure at the common intake end of said network, placing in each branch of said circuit a resistance related inversely to the size of the pipe in the fluid network and continuously maintaining a fixed relation between the value of said resistance and the value of the current flowing in the branch containing said resistance regardless of variations in the motivating intensity of the force producing the flow.

5. In an apparatus for determining the flow in a flow path comprising an electric circuit simulating the flow path, a resistance in said circuit and an automatic control system for the adjustment of said resistance such that the resistance is proportional to the circuit current in which is embodied a current sensitive element, a servo-mechanism, the thereby controlled adjustable resistance and means for stopping said servo-mechanism when the resistance is adjusted to the desired relation to the circuit current and for starting said servo-mechanism when the so-established relation is altered.

6. In an apparatus for determining the flow in a flow path comprising an electric circuit simulating the flow path, a resistance in said circuit and an automatic control system for the adjustment of said resistance according to some prearranged program of dependency on circuit current, in which is embodied a current sensitive element, a servo-mechanism, operating the controlled adjustable resistance through the medium of a properly shaped cam and means for stopping said servo-mechanism when the resistance is adjusted to the desired relation to the circuit current and for starting said servo-mechanism when the so-established relation is altered.

7. In an apparatus for determining the flow in a flow path comprising an electric circuit simulating the flow path, a resistance in said circuit and an automatic control system for the adjustment of said resistance according to some prearranged program of dependency on circuit voltage, in which is embodied a voltage-sensitive element commanding a servo-mechanism and operating the controlled adjustable resistance and means for stopping said servo-mechanism when the resistance is adjusted to the desired relation to circuit voltage and for starting said servo-mechanism when the so-established relation is altered.

8. An automatic control system for the adjustment of electrical circuit resistance according to some prearranged program of dependency on circuit current, and in which is embodied a current-sensitive element, a servo-mechanism operating the controlled adjustable resistance through the medium of a properly shaped cam and means for stopping said servo-mechanism when the resistance is adjusted to the desired relation to the circuit current and for starting said servo-mechanism when the so-established relation is altered, and a variable shunt resistance across the current sensitive element to divert some of the current from said element, thereby altering the working range of the unit.

9. An automatic control system for the adjustment of electrical circuit resistance according to some prearranged program of dependency on circuit current, and in which is embodied a current-sensitive element, a servo-mechanism directly operating the controlled adjustable resistance, a variable shunt resistance across the current sensitive element to divert some of the current from the said element, thus to alter the working range of the unit, and a second variable shunt resistance across the current sensitive element to further divert some of the current from the said element through the medium of a properly designed cam operated by the servo-mechanism, thus to effectively vary the circuit resistance according to some prearranged program of dependency on circuit current.

10. An automatic control system for the adjustment of electrical circuit resistance according to some prearranged program of dependency on circuit voltage, and in which is embodied a voltage-sensitive element commanding a servo-mechanism and operating the controlled adjustable resistance and means for stopping said servo-mechanism when the resistance is adjusted to the desired relation to circuit voltage and for starting said servo-mechanism when the so-established relation is altered, and with an adjustable resistance in series with the voltage-sensitive element to change its sensitivity and thus the range of the unit.

11. An automatic control system for the adjustment of electrical circuit resistance according to some prearranged program of dependency on circuit voltage, and in which is embodied a voltage-sensitive element commanding a servo-mechanism and operating the controlled adjustable resistance, and with an adjustable resistance in series with the voltage-sensitive element to change its sensitivity and thus the range of the unit, and a second adjustable resistance in series, its value controlled through a cam operated through the servo-mechanism such as to achieve the desired program of circuit resistance dependency on circuit voltage.

References Cited in the file of this patent

UNITED STATES PATENTS

| Number | Name | Date |
|---|---|---|
| 1,376,633 | Obermaier | Mar. 5, 1921 |
| 1,573,850 | Naiman | Feb. 23, 1926 |
| 1,916,737 | Midworth | May 7, 1933 |
| 1,968,539 | Rydberg | July 31, 1934 |
| 2,046,990 | Woodrow | July 7, 1936 |
| 2,208,609 | Stover | July 23, 1940 |

FOREIGN PATENTS

| Number | Country | Date |
|---|---|---|
| 849,907 | France | Aug. 28, 1939 |

OTHER REFERENCES

M. I. T. Publication No. 110 entitled "Hydraulic Analysis of Water Distribution Systems by Means of an Electric Network Analyzer," by Thomas R. Camp and H. L. Hazen, published June 1935.